United States Patent
Lam et al.

(10) Patent No.: US 6,198,724 B1
(45) Date of Patent: Mar. 6, 2001

(54) ATM CELL SCHEDULING METHOD AND APPARATUS

(75) Inventors: John Lam; Frank Huang; Eric Fuh; Martin Chen, all of Irvine, CA (US)

(73) Assignee: Vertex Networks, Inc., Irvine, CA (US)

( * ) Notice: Subject to any disclaimer, the term of this patent is extended or adjusted under 35 U.S.C. 154(b) by 0 days.

(21) Appl. No.: 08/943,060

(22) Filed: Oct. 2, 1997

(51) Int. Cl.⁷ .................. H04L 12/26; H04L 12/56
(52) U.S. Cl. ........................... 370/233; 370/412
(58) Field of Search .................. 370/395, 412, 370/468, 252, 253, 397, 233, 229, 230, 231, 232, 234, 235, 413–418

(56) References Cited

U.S. PATENT DOCUMENTS

| | | | |
|---|---|---|---|
| 5,313,454 | 5/1994 | Bustini et al. | 370/13 |
| 5,355,366 | 10/1994 | Li et al. | 370/94.2 |
| 5,357,510 | 10/1994 | Norizuki et al. | 370/60.1 |
| 5,367,643 | 11/1994 | Chang et al. | 395/325 |
| 5,379,297 | 1/1995 | Glover et al. | 370/60.1 |
| 5,390,184 | 2/1995 | Morris | 370/94.2 |
| 5,392,280 | 2/1995 | Zheng | 370/60 |
| 5,412,642 | 5/1995 | Nunokawa | 370/17 |
| 5,414,697 | 5/1995 | Osaki | 370/17 |
| 5,425,029 | 6/1995 | Hluchyj et al. | 370/94.1 |
| 5,434,848 | 7/1995 | Chimento, Jr. et al. | 370/17 |
| 5,448,567 | 9/1995 | Dighe et al. | 370/94.2 |
| 5,453,981 | 9/1995 | Katsube et al. | 370/60.1 |
| 5,491,691 | 2/1996 | Shtayer et al. | 370/61 |
| 5,499,238 | 3/1996 | Shon | 370/60.1 |
| 5,509,001 | 4/1996 | Tachibana et al. | 370/17 |
| 5,515,363 | 5/1996 | Ben-Nun et al. | 370/17 |
| 5,519,689 | 5/1996 | Kim | 370/17 |
| 5,521,905 | 5/1996 | Oda et al. | 370/17 |
| 5,521,916 | 5/1996 | Choudhury et al. | 370/60.1 |
| 5,524,006 | 6/1996 | Hluchyj et al. | 370/84 |
| 5,530,695 | 6/1996 | Dighe et al. | 370/17 |
| 5,533,009 | 7/1996 | Chen | 370/17 |
| 5,533,020 | * 7/1996 | Byrn et al. | 370/395 |
| 5,535,201 | 7/1996 | Zheng | 370/60.1 |
| 5,541,912 | 7/1996 | Choudhury et al. | 370/17 |
| 5,548,581 | 8/1996 | Makrucki | 370/17 |
| 5,555,264 | 9/1996 | Sallberg et al. | 370/17 |
| 5,748,614 | * 5/1998 | Wallmeier | 370/208 |
| 5,889,779 | * 3/1999 | Lincoln | 370/398 |
| 5,953,336 | * 9/1999 | Moore et al. | 370/395 |

OTHER PUBLICATIONS

ATM switching systems/Thomas M. Chen, Stephen S. Liu, 1995, pp. 70–73.

Broadband integrated networks/Mischa Schwartz, 1996, pp. 147–177.

* cited by examiner

*Primary Examiner*—Ajit Patel
*Assistant Examiner*—Brian Nguyen
(74) *Attorney, Agent, or Firm*—Arter & Hadden LLP (57) ABSTRACT

A cell scheduling method and apparatus are described in which cells are efficiently scheduled in four steps. In a first step, a VC is selected for servicing and serviced if necessary. In a second step, cells from the serviced VCs are scheduled for transmission. In a third step, jitter is controlled. In a fourth step, final departure of cells is scheduled.

8 Claims, 9 Drawing Sheets

ATM CELL SCHEDULING METHOD AND APPARATUS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to a method for processing packets in packet switched networks for efficient transmission, and more particularly to processing cells in Asynchronous Transfer Mode (ATM) networks.

2. Description of Related Art

In packet oriented networks, e.g., ATM (Asynchronous Transfer Mode) networks, data packets, also called cells, are forward between different stations and in particular they may pass through numerous switch or other units where arrived packets are forwarded. These transferring stations (most often switches) contain memories or buffers which store the packets before they are forwarded. However, transfers of packets through the network may have time criticality. Thus, the ability of the transferring stations to process packets efficiently is critical.

One problem that arises when performance is low that the buffers, which have limited capacities, may overflow. This results in the need to resend packets at a later time, thus shifting congestion.

ATM networks use time division multiplexing (TDM) to allow multiple data streams to be sent concurrently. These data streams are called Virtual Channels or Virtual Circuits (VCs), and there might be thousands of VCs converging into a single connection. While there might be numerous sources of data (VCs), only one cell at a time can be transmitted.

When a VC is established, a number of parameters are also set. These parameters include: a minimum cell transmission rate called the "sustainable cell rate" (SCR), a peak cell transmission rate (PCR), a cell delay variation time (CDVT) and a burst tolerance (BT). While the SCR and PCR relate to the average throughput of the VC, the CDVT and BT limit the variation in the throughput. The maximum average time between cells is 1/SCR. The minimum average time between cells is 1/PCR. CDVT is the maximum amount of time that a cell may be sent early within 1/PCR. BT is the amount of time that a cell may be sent at 1/PCR without violating the SCR limitation.

According to ATM standards, VCs are set up ("contracted") with different types of service (known as Quality of Service, QoS). Some VCs are set up ("subscribed") with a set transmission rate. These are known as Constant Bit Rate (CBR) VCs. Other VCs are called Variable Bit Rate (VBR), Available Bit Rate (ABR) and Unspecified Bit Rate (UBR). Normally, CBR VCs have the highest priority, and UBR VCs have the lowest priority.

In ATM devices, two critical processes are the segmentation of data into cells for transmission and the reassembly of received cells. Typically, an ATM device includes a component called the "SAR" which performs segmentation and reassembly. Considerable effort has been expended in making segmentation as efficient as possible.

Another key and critical task for the SAR is scheduling cells from various VCs for transmission. A typical first step in pre-transmission processing is selection of a VC to service. Typical prior art methods employ link-list tables which store cells or pointers to cells and information about the priority of each cell. However, this technique requires multiple memory access cycles to complete a single entry scanning. Furthermore, it requires double link-list pointers to add and delete entries. This technique also uses considerable amount of memory.

In other systems, a token is associated with each VC, and there are multiple queues having varied priorities. The tokens are moved from queue to queue during a cyclical scanning process, and the VCs in the highest priority queue are serviced. Movement of the tokens is based upon the relevant VC's subscription rate.

After the order of servicing of VCs is selected, the cells themselves are scheduled for transmission. Two methods are described in the ATM Forum UNI Specification 3.1, in Section 3.6.2.4.1: a virtual scheduling algorithm and a continuous-state leaky bucket algorithm, also known as the generic cell rate algorithm (GCRA). According to the prior art leaky bucket method, cells accumulate in a buffer in the order in which they are to be sent. The leaky buffer fills and empties at a set rate. Cells typically are placed into the buffer in advance of their scheduled departure time. Thus, before the cell at the bottom of the bucket can be sent, the system must ensure that it is time to send the cell. On the next processing cycle, the cell's scheduled departure time is calculated and compared to the present time. If the cell departure time is before or equal to the present time, then the cell is transmitted. If the cell is too early, then the computed departure time is discarded. This process continues until the cell's departure time is met or passed and the cell is transmitted, after which the next cell in the buffer is processed.

Figure 7A:
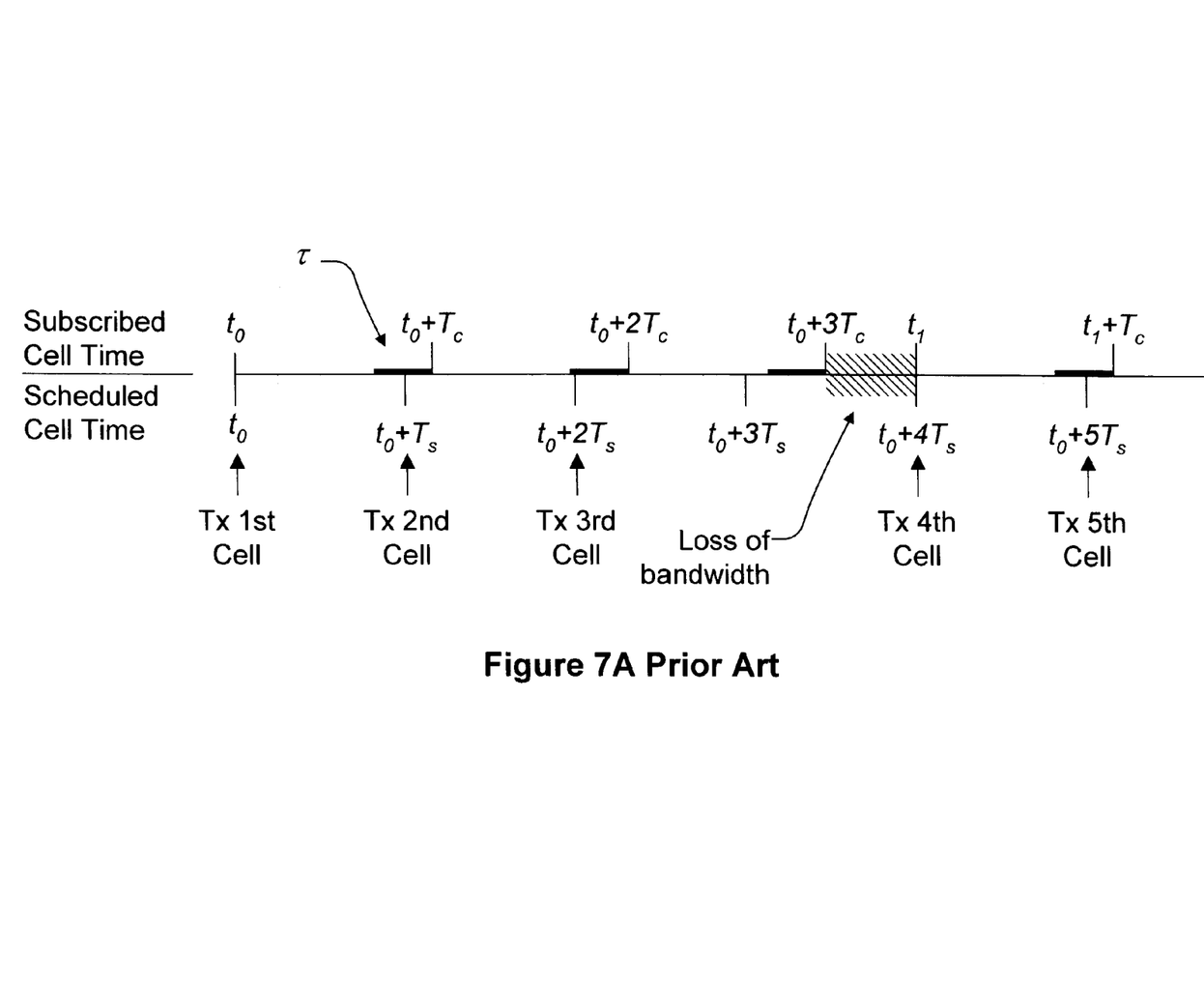
FIG. 7A is a graph of cell times in accordance with the prior art.

Referring now to FIG. 7A, another perspective of the GCRA is appreciated. Normally, cells for a given VC are scheduled to be sent at set intervals $T_s$. $T_s$ is a function of internal cell scheduling resolution. For example, a first cell is transmitted at $t_0$, a second cell transmitted at $t_0+T_s$, and a third cell is transmitted at $t_0+2T_s$. When the VC is established, a subscribed cell time is established also as $T_c$. Thus, the first cell is subscribed to be sent at $t_0$, the second cell is subscribed to be sent at $t_0+T_c$, and the third cell is subscribed to be sent at $t_0+2T_c$. Ideally, $T_s$ is identical to $T_c$. However, due to limited scheduling resolution $T_s$ is less than or equal to $T_c$.

The GCRA necessarily results in increasing differences between the subscribed cell time and the scheduled cell time. $T_s$ is always shorter than $T_c$, so cells are scheduled to be sent earlier and earlier than the subscription time. Eventually, a cell will be scheduled too soon before the subscribed time. This limit τ is also established when the VC is established. This limit is also known as the cell delay variation time (CDVT). If a cell is scheduled to be sent within this limit, then the cell is said to be "conforming."

The GCRA necessarily results periodically in some cells being non-con the prior art, non-conforming cells are typically rescheduled $T_s$ later. For example, in FIG. 7A, the fourth cell was initially scheduled for transmission at $t_0+3T_s$. However, this time would have been more than τ before $t_0+3T_c$. Therefore, the cell was rescheduled to be sent at $t_0+4T_s$ and the subscribed time was reset to $t_1$, the new scheduled transmission time. As a result, there is a loss of bandwidth or failure to keep up with the subscribed cell rate.

There has been a suggestion to include a final traffic shaping step in ATM transmission systems. According to this suggestion, in the traffic shaping step, the flow of cells is smoothed to reduce the chance of traffic congestion which might occur inside an ATM device due to the burstiness of incoming traffic. A parallel sequencing scheme was suggested to achieve this. However, the parallel sequencing scheme requires multiple copies of hardware logic—one for each cell; it has a very high cost rendering it impractical for medium and low costs implementations, and requires reordering of every arrival or departure of cells.

It is therefore the object of the invention to efficiently schedule cells for transmission in a packet switched network. It is an object to select VCs for servicing. It is also an object to produce service requests in a constant time interval with minimum jitter. It is an object to provide for selection of VCs having different priorities and levels of priority. It is an object to automatically offset or compensate when under scan situations arise. It is an object to minimize memory requirements. It is an object to provide preemptive interrupts by higher priority VCs.

It is a further object of the invention to efficiently schedule cells for transmission. It is an object to do so with minium scheduling overhead, minimum latency introduced by the scheduling process and high scheduling accuracy with minimum jitter.

It is a further object of the invention to efficiently control and minimize cell transmission jittering. It is an object of the invention to schedule cells to take advantage of the allowed CDVT. It is an object of the invention to avoid transmission of late cells. It is an object of the invention to minimize scheduling overhead.

It is an object of the invention to efficiently schedule prepared cells for final departure. It is also an object of the invention to set departure priorities without having to redetermine the departure time.

It is an object of the invention to eliminate or minimize the loss of transmission bandwidth.

It is a further object to provide the above in a simple hardware implementation.

SUMMARY OF THE INVENTION

The previously described objects are achieved in a cell scheduling method and apparatus in which cells are scheduled in an efficient manner in four steps. In a first step, a VC is selected for servicing and serviced if necessary. In a second step, cells from the serviced VCs are scheduled for transmission. In a third step, jitter is controlled. In a fourth step, final departure of cells is scheduled.

The first step of the invention provides a system for selecting a VC to be serviced. According to the invention, there are a number of queues, called rate queues, created in memory. For each VC, there is an entry in one or more of the rate queues. The rate queues have a relative priority. Each rate queue has variable length. Each entry includes the VC's subscription rate and a pointer to a buffer holding cells for the VC.

A rate queue scanner scans down the rate queues in order of priority. Services to lower priority rate queues can be preempted by requests from higher priority rate queues. Furthermore, within a rate queue, a higher subscription rate will also correlate to a higher priority.

Sometimes, a VC with a lower priority will not be serviced even though its subscription accords it service. To prevent VCs from continuously falling behind their subscription rates, the rate queue scanner can "catch up" with the subscribed rate with minimum loss of line bandwidth. This is achieved by monitoring and updating a counter stored in each rate queue entry.

The rate queue scanner dispatches cells to a transmit cell scheduler. The transmit cell scheduler determines if queued cells are too early. If a cell is too early, the transmit cell scheduler discards the cell, and on the scanner's next scan cycle, that cell will be dispatched again. If the cell is conforming, then the cell and its scheduled transmission time are buffered for transmission.

In accordance with the invention, non-conforming cells are rescheduled to be transmitted a small amount of time, less than $T_s$, later. Rescheduling of departure times has no effect on the arrival time schedule.

One more level of scheduling takes place before the cells are sent. Using the cell departure scheduling method, cells awaiting transmission in the transmit cell buffer are sent in an efficient manner. A cell departure sequencer scans from the first slot in the buffer to the last slot in the buffer, and causes the cell with the earliest departure time to be sent.

As an additional feature, if this cell is to be sent too soon after the last cell was sent, then an idle cell is sent and the cell departure sequencer performs its next scan cycle.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
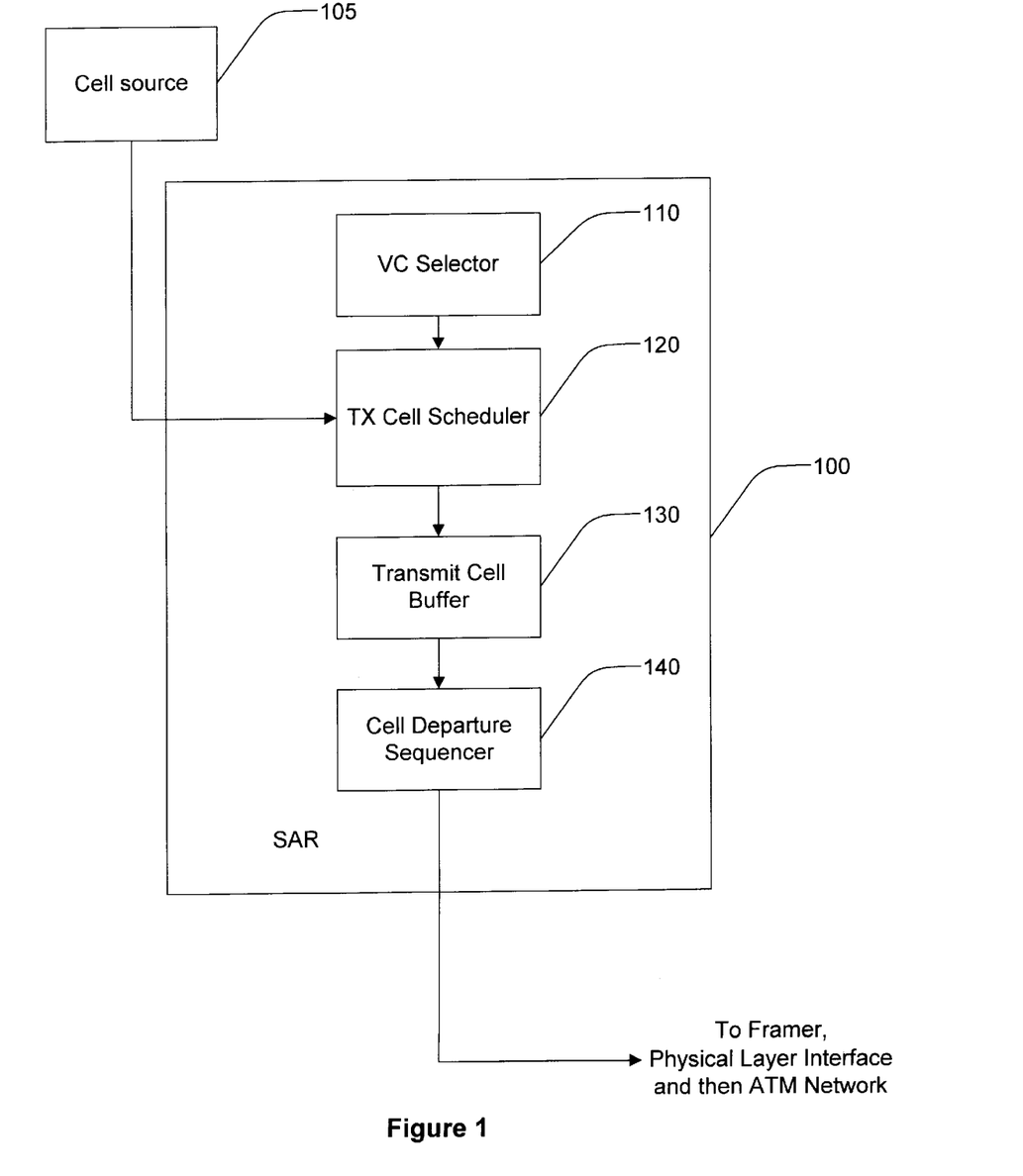
FIG. 1 is a block diagram of a packet selection and scheduling device in accordance with the invention.

Referring now to FIG. 1, there is shown is a block diagram of a packet selection and scheduling device 100 in accordance with the invention. The device 100 includes a virtual channel selector 110, a transmission cell scheduler 120, a transmit cell buffer 130 and a cell departure sequencer 140. The device 100 receives cells from a cell source 105, manages the timing of transmission of the cells, and passes the scheduled cells to a framer, a physical layer interface and eventually a digital communications network (not shown). Preferably, the transmit cell scheduler 120 and cell departure sequencer 140 are embodied as firmware in an ASIC.

The VC selector 110 selects the order in which the active VCs are serviced. After the VC selector 110 has selected a VC to be serviced, the transmit cell scheduler 120 schedules cells from the selected VCs. The transmit cell scheduler 120 schedules the cells in advance of their transmission time, and a cell's scheduled departure time is preferably reconfirmed before the cell is queued for departure. The transmit cell scheduler 120 loads the cell into the transmit cell buffer 130 along with the cell's scheduled transmission time. Alternatively, a record comprising a pointer to the cell and the schedule transmission time could also be laved into the transmit cell buffer 140.

The cell departure sequencer 140 scans the transmit cell buffer 130 and causes the cells to be sent in order according to their scheduled departure times.

The cell source 105 does not provide cells directly to the transmission cell scheduler 120. Instead, there are preferably a number of buffers in a memory, and each VC is assigned a buffer. Cells for a given VC are stored in the VC's buffer.

Figure 2:
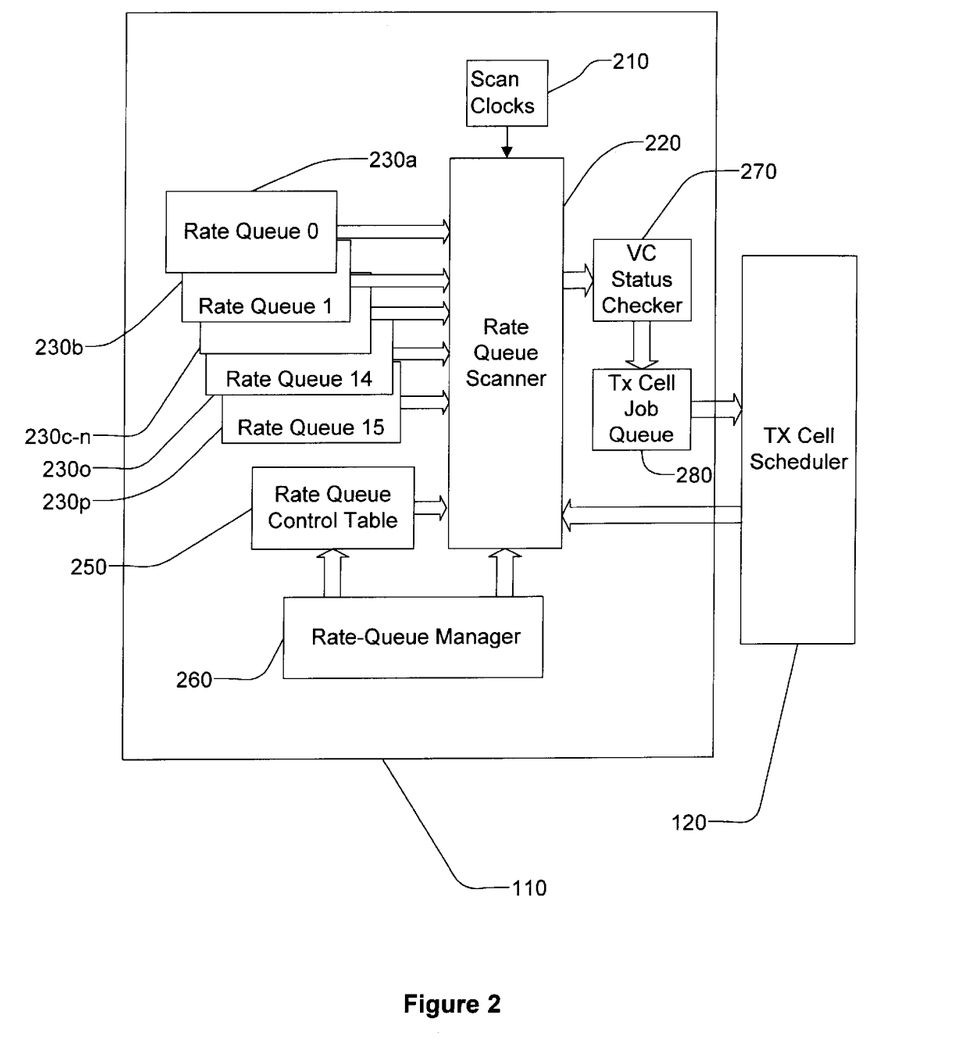
FIG. 2 is a block diagram of a VC selector and a transmit cell scheduler in accordance with the invention.

Referring now to FIG. 2, there is shown a block diagram of the VC selector 110 coupled to the transmission cell scheduler 120. The VC selector 110 comprises a rate queue scanner 220, a number of rate queues 230, a rate queue control table 250, a rate queue manager 260, a number of scan timers 210, a VC status checker 270 and transmit cell job queue 280. The transmit cell job queue 280 is preferably a FIFO into which pointers to VC's buffers are stored for scheduling cells for transmission by the transmit cell scheduler 120. Preferably, the rate queue scanner 220 and rate queue manager 260 are embodied as firmware in an ASIC.

The rate queue control table 250, also preferably stored in a memory, is for storing the size and location of each rate queue 230a–p. The rate queue control table 250 is created and maintained by the rate queue manager 260. The rate queue control table 250 preferably includes one entry for each rate queue 230a–p. The entry includes a flag to show whether the rate queue is active, a maximum size for the rate queue and a pointer to the beginning in memory of the rate queue. The entry, for ABR rate queues, preferably also includes a pointer to an ABR rate table for that rate queue, and a flag to show whether the ABR rate table is valid. The ABR rate table is used for fast ABR rate adjustment required by the ATM Forum's Flow Control Specification.

Preferably, the rate queues 230 are implemented in a dedicated high speed memory. The rate queues 230 are created by the rate queue manager 260 but maintained by the rate queue scanner 220. Each rate queue 230a–p preferably has a header entry as a first entry, followed by a number of entries for each VC associated with the given rate queue. Preferably, a rate queue 230a–p may have up to 1024 entries, permitting up to 1023 VCs to be associated with each rate queue 230a–p.

The header entry preferably includes the number of valid entries in the rate queue. The header entry also preferably stores a scan offset which is incremented by a rate queue scanner 220 when services to the rate queue are interrupted. The scan offset is cleared by the rate queue scanner 220 when services to the rate queue resume. A pointer (or an offset for a pointer) to the rate queue's next entry to be serviced after services to the rate queue resume is recorded by the rate queue scanner 220 in the header entry.

For the body of the rate queue, the entries are different from the header entry and preferably are easily differentiated by the rate queue scanner 220 from the header entry. A body entry includes a flag for enabling or disabling service to the VC, and a counter maintained by the rate queue scanner 220 to store the subscription rate credit for the VC. The counter is decremented for every scan cycle. If the counter reaches 0, then the rate queue scanner 220 checks for cell transmission and its NCCT. If a cell is schedule for transmission, the credit is restored to its subscription rate. If no cell is scheduled for transmission then the counter remains at 0 until the next cell is transmitted.

The VC's quality of service classification is also stored in the entry. Alternatively, the header entry or the rate queue control table 250 could include a quality of service field, since all VCs in a given rate queue preferably have similar service priority. Entries for VCs with different QoS may be included in the same rate queue. For example, ABR, VBR and CBR VCs may be included in a single queue.

The entry further includes the VC's subscription rate, and a pointer to where the VC's cells are stored. ABR and VBR VCs may have entries in more than one rate queue—a primary and a secondary rate queue. This permits the ABR and VBR VCs to comply with their SCR/MCR and PCR/SCR requirements. The primary rate queue provides the guaranteed services at MCR for the ABR VCs or SCR or VBR VCs. They should be in higher priority queues. The secondary queues provide the additional services up to SCR for ABR VCs or PCR for VBR VCs. Even though these are higher in service rate, they should be in lower priority queues since they are only serviced if bandwidth is available.

In accordance with the invention, VCs are prioritized for servicing on two levels. First, VCs are grouped by quality of service. CBR VCs have the highest priority, then VBR VCs, ABR VCs and lastly VBR VCs. The rate queue scanner 220 preferably supports up to sixteen rate queues 230a–p. A varying number of rate queues may be assigned to each quality of service. In the second level of prioritization, for a particular quality of service, the VCs are prioritized based upon their subscription rates. The effect of this is that the rate queue entries for lower priority VCs, such as ABR VCs and UBR VCs with a low subscription rate, are scanned at a lower rate than the rate queue entries for higher priority VCs.

There are a few additional preferred rules in creating and maintaining the rate queues 230:

- CBR VCs and VBR VCs should be prioritized together by the order of their assigned subscription rate.
- If both a CBR VC and a VBR VC have the same subscription rate, then the CBR VC is given priority over the VBR VC.
- UBR VCs have the lowest priority and should be prioritized by the order of their assigned subscription rate.

The rate queue scanner 220 preferably operates at a sufficiently high speed that, for most scans, there is no need to schedule cells for transmission. Preferably, rate queue 230a is given the highest priority and rate queue 230p is given the lowest priority. The rate queue scanner 220 preferably can preempt services to relatively lower priority rate queues by requests for service from relatively higher priority rate queues.

There is a scan timer 210 associated with each rate queue 230. For each rate queue, there is a request counter which is incremented with each timer tick. Each rate queue has its own scan timer 210. The request counter is cleared by the rate queue scanner 220 after the rate queue scanner 220 has finished scanning the rate queue.

Figure 3A:
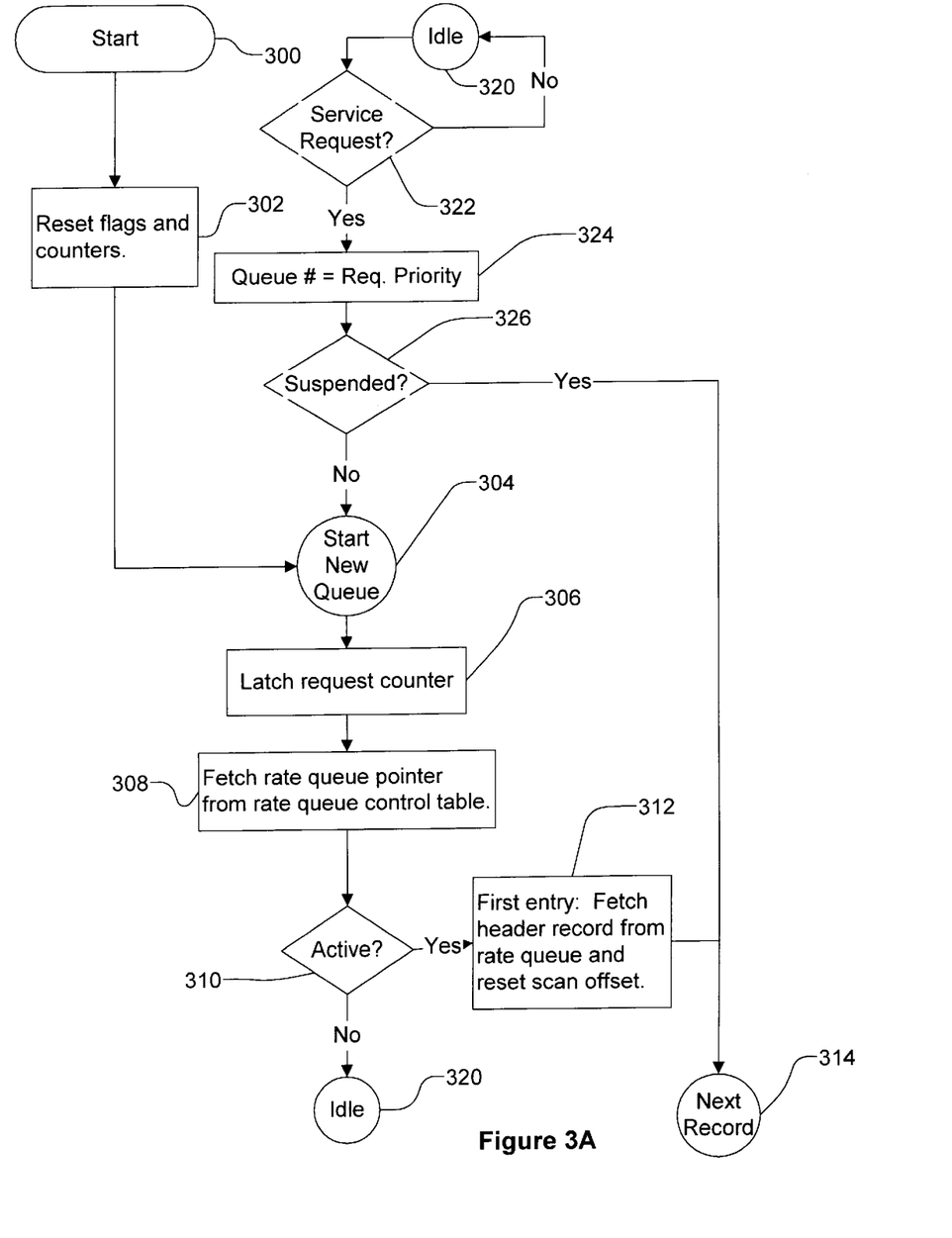
FIGS. 3A and 3B are a flow chart of a method of selecting a virtual channel for servicing in accordance with the invention.
Figure 3B:
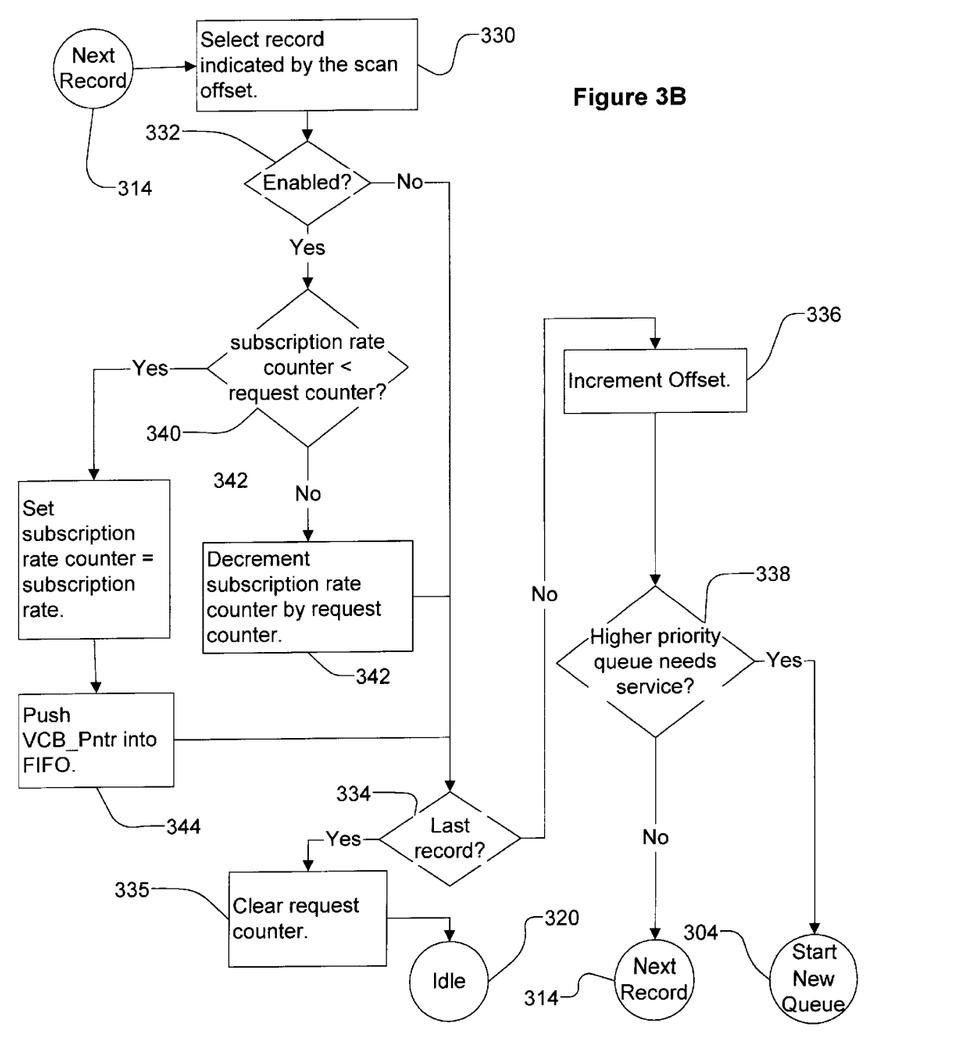

Referring now to FIGS. 3A and 3B, there is shown a flow chart of a method of selecting a virtual channel for servicing in accordance with the invention. This process is begun preferably after the rate queue manager 260 has created the rate queue control table 250 and rate queues 230. After the rate queue scanner 220 is started (step 300), the scanner 220 selects the first rate queue 230a by resetting various flags and counters (step 302).

Next, in step 304, the scanner 220 starts the scanning of the selected rate queue. In step 306, the scanner 220 latches the request counter. The request counter, at this point, will have a value of either 1, 2 or even 3.

Next, the scanner 220 accesses the rate queue control table 250 and fetches the rate queue pointer for the selected rate queue (step 308). The scanner 220 also checks if the selected rate queue is active (step 310). If not, then the scanner reverts to an idle state 320. Otherwise, the scanner 220 fetches the selected rate queue's header entry and resets the scan offset (to 1) (step 312). The scanner 220 then begins a subprocess for scanning entries within the selected rate queue (step 314).

In step 330, the scanner 220 selects the entry of the next VC in the selected rate queue to be serviced. This is indicated by the scan offset in the selected rate queue's header entry. The scanner 220 determines if the VC associated with the selected entry is enabled (step 332). If the VC is not enabled, then the scanner 220 checks if the selected entry is the last entry in the selected rate queue (step 334). If the selected entry is the last entry in the selected rate queue, then the request counter is cleared (step 335) and the scanner returns to the idle state 320.

If the selected entry is not the last entry in the selected rate queue, then the scanner 220 increments the scan offset (in the header entry of the selected rate queue) (step 336). Next, the scanner checks if a higher priority rate queue has a pending request for service of a VC (step 338). If there is no such pending request for service, then the scanner 220 processes the next entry of the selected rate queue (step 314). Otherwise, the scanner 220 will select the higher priority rate queue for scanning (step 304).

Returning again to step 332, if the selected VC is enabled, then the scanner 220 tests and corrects for scan under-run. If the subscription rate counter is less than the request counter (step 340), then the scanner reloads the subscription rate credit (step 342). In other words, the subscription rate counter is set to the subscription rate. Next, in step 344, the scanner 220 pushes the pointer to where the VC's cells are stored in the transmit cell job queue 280. With the pointer pushed into the transmit cell job queue 280, the scanner 220 continues at step 334.

If the subscription rate credit meets or exceeds the request count 1, then the subscription rate counter is decremented by the request counter (step 346) and the scanner 220 continue at step 334. This allows the scanner 220 to "catch up" without underscanning.

Referring back to the idle step 320, the scanner 220 checks if any of the rate queues is requesting service (step 322). This may be because service to one or more of the rate queues was interrupted by a higher priority queue (in step 338) or there is a pending request for service by one or more of the rate queues. The scanner 220 then selects whichever rate queue is requesting service and has the highest priority (step 324). If service to the selected rate queue was suspended (step 326), then processing of the selected rate queue continues with the next entry (step 314). Otherwise, the selected rate queue is serviced anew (step 304).

While the VC selector 110 is selecting VCs for servicing as described above, the transmit cell scheduler 120 is cyclically scanning through the transmit cell job queue 280 and examining each entry in the transmit cell job queue 280. The transmit cell scheduler 120 determines if a cell associated with a selected entry is too early and, if not, places the cell in the transmit cell buffer 130 and determines a preliminary transmission time for the cell. If the cell is too early, then the transmit cell scheduler 120 preferably resets the subscription rate count in the VC's entry in the relevant queue 230, so that the rate queue scanner 220 will mark the same cell for dispatch in its next cycle.

Figure 4:
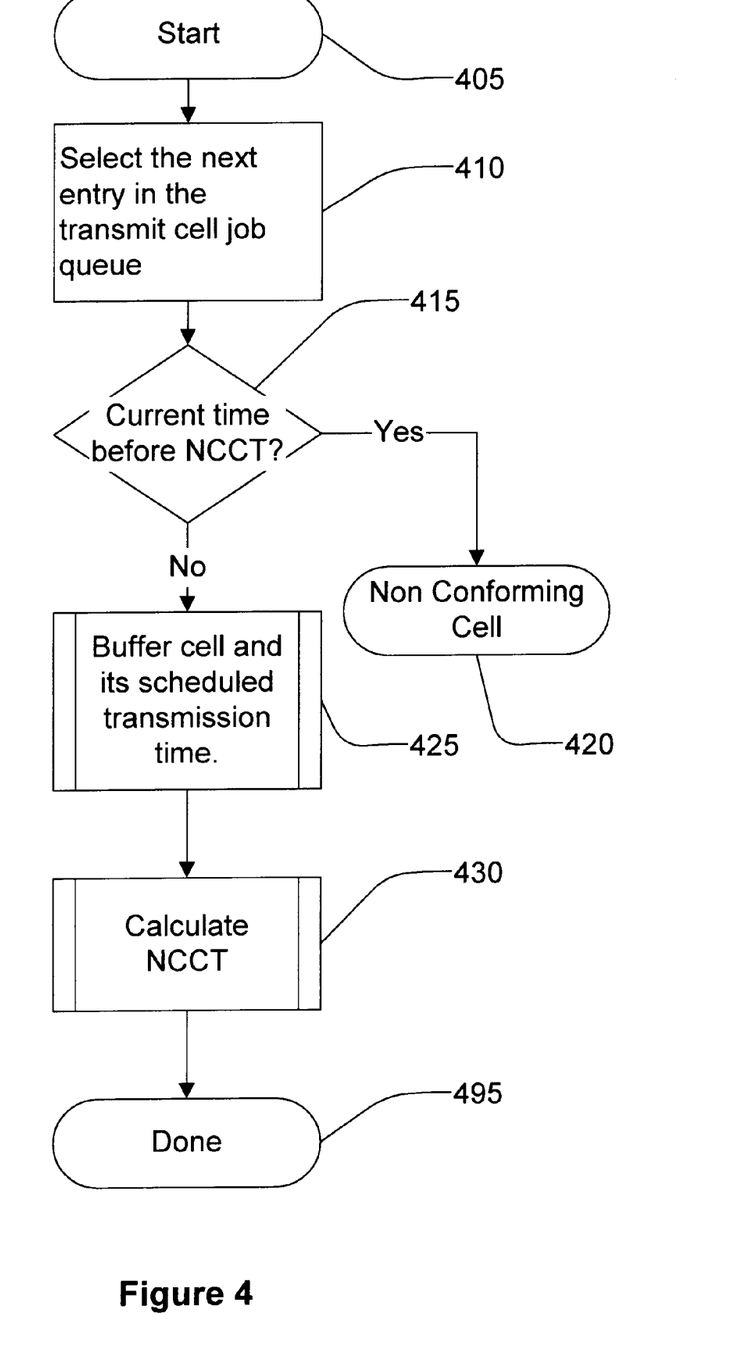
FIG. 4 is a flow chart of a method of scheduling cells in accordance with the invention.

Referring now to FIG. 4, the method of scheduling cells performed by the transmit cell scheduler 120 is described. In step 405, the method begins. Next, the transmit cell scheduler 120 selects the next entry in the transmit cell job queue 280 (step 410). The current time is then compared to a previously computed "next compliant cell time" (NCCT) for the selected entry (step 415).

NCCT is the earliest time that the cell may be sent in compliance with the VC's peak cell rate (PCR). A cell sent at any time after the NCCT will conform to the peak cell rate. If the current time is before the NCCT, then the SAR 100 has worked too fast and the cell is ready too soon. Such a cell is considered "nonconforming" and will not be sent (step 420). Entries for nonconforming cells remain in the transmit cell job queue 280 until their cells become conforming. If the cell is conforming, then the cell is buffered and scheduled to be sent immediately (step 425).

Next, the transmit cell scheduler 120 recalculates the VC's NCCT so that the time for sending the next cell from the buffer can be known (step 430). This concludes processing of the entry (step 495), and the transmit cell scheduler 120 continues its scan cycle.

Figures 5, 6:
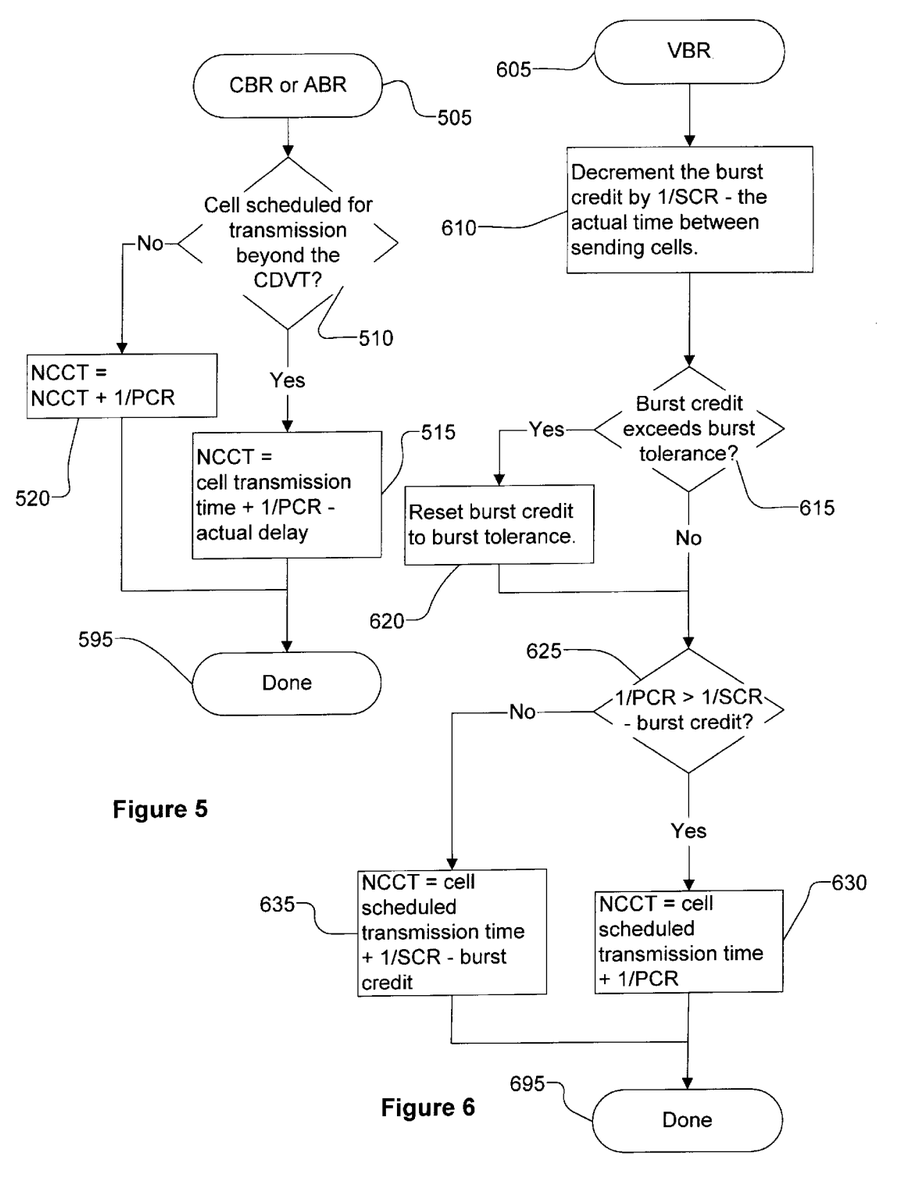
FIG. 5 is a flow chart of a method of calculating a next compliant cell time for a CBR or an ABR VC.
FIG. 6 is a flow chart of a method of calculating a next compliant cell time for a VBR VC.

The NCCT is calculated differently for VBR VCs on the one hand and CBR and ABR VCs on the other. Referring now to FIG. 5, there is shown a flow chart of a method of calculating a next compliant cell time for a CBR or an ABR VC. After the method begins (step 505), the cell delay variation time (CDVT) for the VC is compared to how much later the cell was scheduled for transmission after the NCCT (step 510). If the cell was scheduled for transmission beyond the CDVT, then the NCCT needs to conform with the minimum cell time (1/PCR). This is accomplished by setting the NCCT to the cell's scheduled transmission time (or the current cell time) plus the minimum time between cells for the VC (essentially the inverse of the PCR), and less the CDVT (step 515). Otherwise the NCCT is incremented by the minimum time between cells for the VC (step 520). This then concludes determination of the NCCT for CBR and ABR VCs (step 595).

Referring now to FIG. 6, there is shown a flow chart of a method of calculating a next compliant cell time for a VBR VC. The NCCT is derived from the cell's scheduled transmission time, the VC's SCR (sustainable cell rate), the VC's PCR (peak cell rate), the VC's burst tolerance (BT) and when the last cell was scheduled for transmission. The NCCT is calculated based upon how much "burst credit" the VC has. The burst credit is the cumulative amount of time that cells were sent after their respective NCCTs. A similar concept was applied with respect to determining NCCTs for VBR VCs, above.

After starting (step 605), the burst credit is decremented by 1/SCR (the maximum time between sending cells) (step 610). If the burst credit exceeds the burst tolerance (step 615), then the burst credit is reset to the burst tolerance (step 620).

In either case, it is determined whether the minimum time between sending cells (1/PCR) exceeds the difference between the maximum time between sending cells and the burst credit (step 625). If not, then NCCT is set to the cell scheduled transmission time+1/SCR−burst credit (step 630). Otherwise, NCCT is set to the cell scheduled transmission time+1/PCR (step 635). This then concludes determination of when the next cell may be sent (step 695).

By incorporating the burst credit into the calculation of NCCT, the cells are "squeezed" as closely in time as possible without exceeding the PCR, missing the SCR or exceeding the BT. By keeping the cells as close together in time as possible, the method results in a transmission rate which approaches the PCR. The invention therefore minimizes scheduling overhead and minimizes latency introduced by the scheduling process. Furthermore, the invention improves scheduling accuracy and minimizes jitter. As mentioned, prior art systems typically utilize the leaky bucket method for scheduling cells. Although the transmit cell scheduler 120 could use the leaky bucket method, the inventors recognized that there is an inherent loss of bandwidth by using the leaky bucket method, as shown in FIG. 7A. In accordance with the invention, the rate at which the scheduler 120 scans the transmit cell job queue 280. The adaptive rate scanning method of the invention avoids bandwidth loss due to rescheduling and therefore guarantees the subscribed PCR service.

Whenever the transmit cell scheduler 120 detects a non-conforming cell, it signals the rate queue scanner 110 to schedule for another transmission by the next sub_rate scan time. There is a condition that the sub_rate scan period must be less than the subscribed CDVT value. The sub_rate is a multiplication factor of $1/T_s$.

Figure 7B:
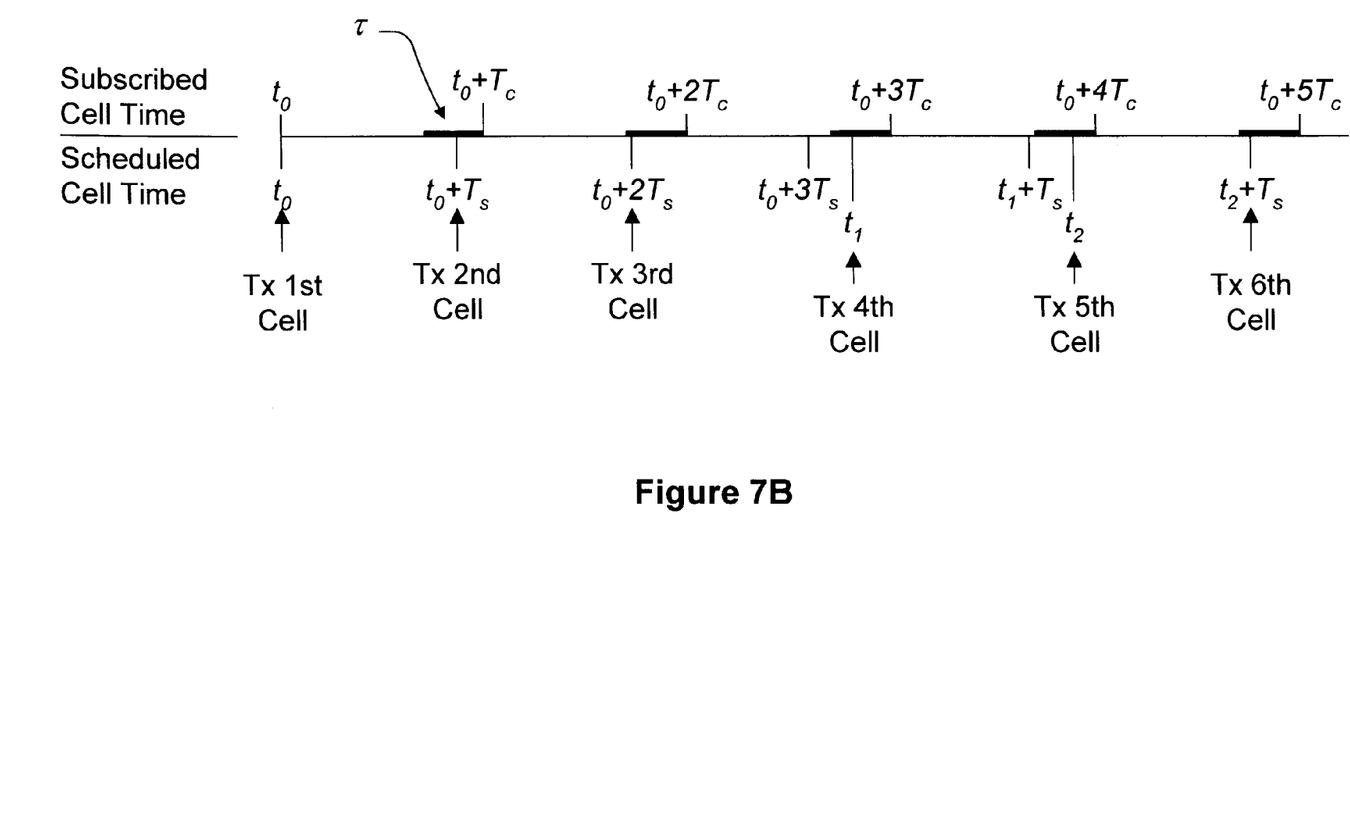
FIG. 7B is a graph of cell times in accordance with the invention.

This is shown more clearly through the example of FIG. 7B. A first cell is scheduled to be transmitted and subscribed to be transmitted at $t_0$. The first cell is conforming. A second cell is scheduled to be transmitted at $t_0+T_s$ and subscribed to be transmitted at $t_0+T_c$. The second cell is conforming. A third cell is scheduled to be transmitted at $t_0+2T_s$ and subscribed to be transmitted at $t_0+2T_c$. The third cell is conforming. A fourth cell is scheduled to be transmitted at $t_0+3T_s$ and subscribed to be transmitted at $t_0+3T_c$. The fourth cell will not be conforming. However, rather than rescheduling the cell at $t_0+4T_s$ as in the prior art, the scheduling clock is reset one tick after $t_0+3T_s$ and designated $t_1$. Another difference is that the clock for the subscribed cell time is not reset. As can be seen, since $t_1$ is within τ of $t_0+3T_c$, the fourth cell is conforming. The fifth cell is then scheduled to be transmitted at $t_1+T_s$ and subscribed to be transmitted at $t_0+4T_c$. Once again, because the fifth cell will not be conforming, the scanner resets the scheduling clock one tick after the schedule transmission time and designates this as $t_2$. Now the fifth cell is conforming.

Thus, there is no time lost or loss of bandwidth as in typical prior art systems.

Cell Departure Sequencer

One more level of scheduling, by the cell departure sequencer 140 (FIG. 1), takes place before the cells are sent. Using the cell departure scheduling method of the invention, cells awaiting transmission in the transmit cell buffer 130 are sent in an efficient manner. The primary function of the cell departure sequencer 140 is to ensure that no cell will be transmitted without fully conforming with its traffic contract.

Figure 8:
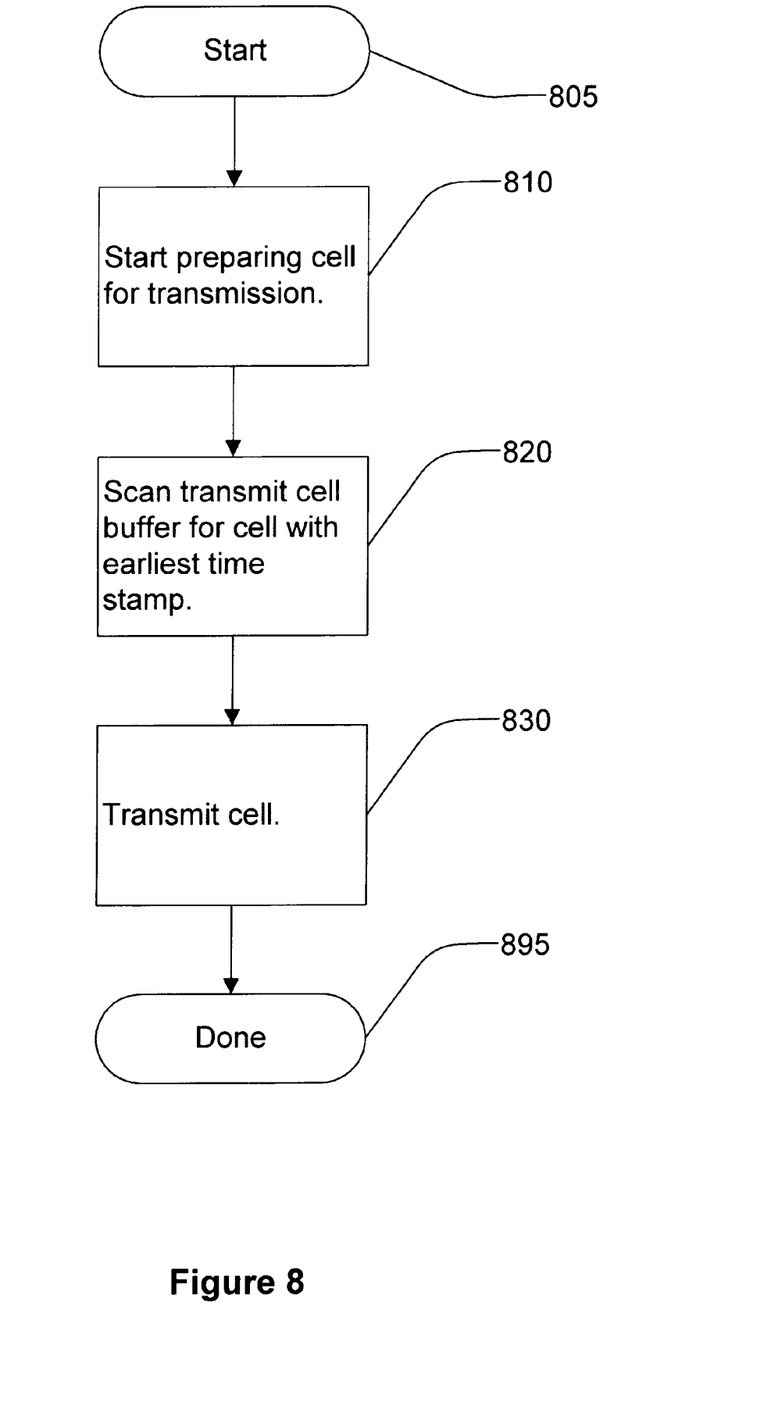
FIG. 8 is a flow chart of the cell departure scheduling method according to the present invention.

Referring now to FIG. 8, upon the start of cell transmission (step 805), the cell departure sequencer 140 starts to prepare for the next cell to be transmitted (step 810). The cell departure sequencer 140 then scans the transmit cell buffer 130 from its first slot to its last slot (step 820), and the cell with the earliest departure time is sent (step 830).

As an additional feature, the cell's scheduled departure time is compared with the NCCT. If the cell is scheduled to be sent too soon, then an idle cell is sent and the cell departure sequencer performs its next scan cycle.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. In a digital communications network for communicating cells wherein virtual channels are established for sequentially transmitting cells, and for each virtual channel there is a subscription rate setting a minimum rate at which cells are transmitted in the virtual channel and a peak cell rate setting a maximum rate at which cells are transmitted in the virtual channel, a method of scheduling cells for transmission comprising the steps of:

(a) selecting a next cell for transmission;
  (b) comparing a current time to a next compliant cell time, the next compliant cell time comprising the earliest time that the next cell is sent in compliance with the peak cell rate of the virtual channel associated with the next cell;
    (1) if the current time is before the next compliant cell time then selecting a new next cell for transmission;
    (2) else buffering the next cell and calculating a new next compliant cell time;

wherein each virtual channel has a burst credit reflecting a cumulative amount of time that cells for the virtual channel were sent after their respective next compliant cell times, wherein the step of calculating the next compliant cell time comprises, if a minimum time between cells exceeds the difference between a maximum time between cells and the burst credit, then setting the next compliant cell time to a scheduled transmission time of the next cell plus the maximum time between cells and less the burst credit, and otherwise setting the next compliant cell time to the scheduled transmission time of the next cell plus the minimum time between cells, whereby cells are sent as closely in time as possible without exceeding the peak cell rate, missing the subscription rate or exceeding a burst tolerance.

2. In a digital communications network for communicating cells wherein virtual channels are established for sequentially transmitting cells, and for each virtual channel there is a subscription rate setting a minimum rate at which cells are transmitted in the virtual channel and a peak cell rate setting a maximum rate at which cells are transmitted in the virtual channel, a method of scheduling cells for transmission comprising the steps of:

(a) selecting a next cell for transmission;
  (b) comparing a current time to a next compliant cell time, the next compliant cell time comprising the earliest time that the next cell is sent in compliance with the peak cell rate of the virtual channel associated with the next cell;

(1) if the current time is before the next compliant cell time then selecting a new next cell for transmission;

(2) else buffering the next cell and calculating a new next compliant cell time;

wherein each virtual channel has a cell delay variation time reflecting a rounding error between the subscription rate and a line rate and a scheduling variance, wherein if the next cell is scheduled for transmission beyond the cell delay variation time, the step of calculating the next compliant cell time comprises, incrementing the next compliant cell time by a minimum time between cells, and otherwise setting the next compliant cell time to a transmission time of the next cell plus the minimum time between cells less the cell delay variation time, whereby cells are sent as closely in time as possible without exceeding the peak cell rate, missing the subscription rate or exceeding a burst tolerance.

3. In a digital communications network for communicating cells wherein virtual channels are established for sequentially transmitting cells, and for each virtual channel there is a subscription rate setting a minimum rate at which cells are transmitted in the virtual channel and inversely a maximum time between cells, a peak cell rate setting the maximum rate at which cells are transmitted in the virtual channel and inversely a minimum time between cells, and a cell delay variation time setting a maximum delay from the subscription rate, a method of scheduling cells of a given virtual channel for transmission, each cell of the given virtual channel having a respective offset number associated therewith equal to an incremental number of cells transmitted in the virtual channel from a reference cell, the method comprising the steps of:

(a) comparing a preliminary transmission time for a given cell of the given virtual channel to a subscribed cell time for the given cell, wherein the preliminary transmission time comprises the actual transmission time of the reference cell of the virtual channel plus the offset number for the given cell times the minimum time between cells, and the subscribed cell time comprises the actual transmission time of the reference cell of the virtual channel plus the offset number for the given cell times the maximum time between cells;

(b) if the preliminary transmission time is not more than the cell delay variation time before the subscribed cell time, then scheduling the given cell for transmission at the preliminary transmission time;

(c) else scheduling the given cell for transmission at the preliminary transmission time plus a tick, the tick comprising an amount of time less than the minimum time between cells.

4. The method of scheduling a given cell of a given virtual channel for transmission as set forth in claim 3 wherein the tick is less than the cell delay variation time.

5. An advance cell scheduler for a digital communications network for communicating cells wherein virtual channels are established for sequentially transmitting cells, and for each virtual channel there is a subscription rate setting a minimum rate at which cells are transmitted in the virtual channel and a peak cell rate setting a maximum rate at which cells are transmitted in the virtual channel, the advance cell scheduler comprising:

(a) means for selecting a next cell for transmission; and (b) means for comparing a current time to a next compliant cell time, the next compliant cell time comprising an earliest time that the next cell is sent in compliance with the peak cell rate of the virtual channel associated with the next cell; and (c) means for determining if the current time is before the next compliant cell time and, if so, selecting a new next cell for transmission, and otherwise buffering the next cell and calculating a new next compliant cell time.

wherein each virtual channel has a burst credit reflecting a cumulative amount of time that cells for the virtual channel were sent after their respective next compliant cell times, and the advance cell scheduler includes means for calculating the next compliant cell time comprising means for determining if a minimum time between cells exceeds the difference between a maximum time between cells and the burst credit, and if so, setting the next compliant cell time to a scheduled transmission time of the next cell plus the maximum time between cells and less the burst credit, and otherwise setting the next compliant cell time to the scheduled transmission time of the next cell plus the minimum time between cells.

6. An advance cell scheduler for a digital communications network for communicating cells wherein virtual channels are established for sequentially transmitting cells, and for each virtual channel there is a subscription rate setting a minimum rate at which cells are transmitted in the virtual channel and a peak cell rate setting a maximum rate at which cells are transmitted in the virtual channel, the advance cell scheduler comprising:

(a) means for selecting a next cell for transmission; and (b) means for comparing a current time to a next compliant cell time, the next compliant cell time comprising an earliest time that the next cell is sent in compliance with the peak cell rate of the virtual channel associated with the next cell; and (c) means for determining if the current time is before the next compliant cell time and, if so, selecting a new next cell for transmission, and otherwise buffering the next cell and calculating a new next compliant cell time;

wherein each virtual channel has a cell delay variation time reflecting a rounding error between the subscription rate and a line rate and a scheduling variance, the advance cell scheduler including means for determining if the next cell is scheduled for transmission beyond the cell delay variation time, and if so, incrementing the next compliant cell time by a minimum time between cells, and otherwise setting the next compliant cell time to the transmission time of the next cell plus the minimum time between cells less the cell delay variation time.

7. A cell departure sequencer for a digital communications network for communicating cells wherein virtual channels are established for sequentially transmitting cells, and for each virtual channel there is a subscription rate setting a minimum rate at which cells are transmitted in the virtual channel and inversely a maximum time between cells, a peak cell rate setting a maximum rate at which cells are transmitted in the virtual channel and inversely a minimum time between cells, and a cell delay variation time setting a maximum delay from the subscription rate, a method of scheduling a given cell of a given virtual channel for transmission, each cell of the given virtual channel having a respective offset number associated therewith equal to an incremental number of cells transmitted in the virtual channel from a reference cell, the cell departure sequencer comprising:

(a) means for comparing a preliminary transmission time for the given cell to a subscribed cell time for the given cell, wherein the preliminary transmission time comprises an actual transmission time of the reference cell of the virtual channel plus the offset for the given cell times the minimum time between cells, and the subscribed cell time comprises the actual transmission time of the reference cell of the virtual channel plus the offset for the given cell times the maximum time between cells;

(b) means for determining if the preliminary transmission time is not more than the cell delay variation time before the subscribed cell time, and if so, then scheduling the given cell for transmission at the preliminary transmission time, and otherwise scheduling the given cell for transmission at the preliminary transmission time plus a tick, the tick comprising an amount of time less than the minimum time between cells.

8. The cell departure sequencer as set forth in claim 7 wherein the tick is less than the cell delay variation time.

* * * * *